R. H. ROBINSON.
NUT LOCK.
APPLICATION FILED MAY 22, 1919.
1,320,095.
Patented Oct. 28, 1919.
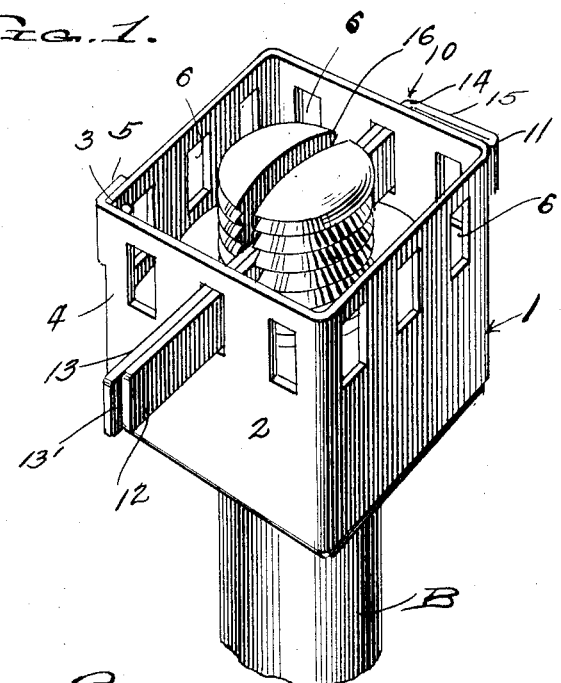
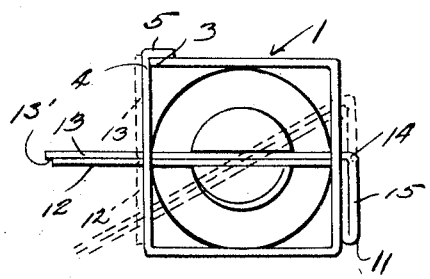
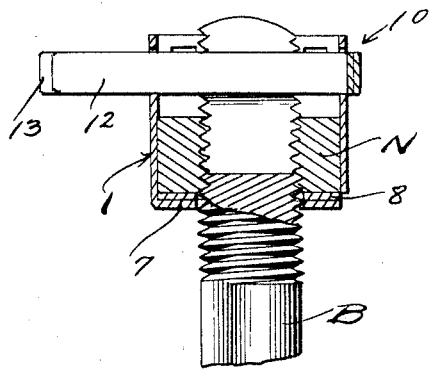
Witnesses
Inventor
Richard H. Robinson
By Richard Bliver
Attorney

UNITED STATES PATENT OFFICE.

RICHARD H. ROBINSON, OF WEST SOMERVILLE, MASSACHUSETTS.

NUT-LOCK.

1,320,095.  Specification of Letters Patent.  Patented Oct. 28, 1919.

Application filed May 22, 1919. Serial No. 298,825.

*To all whom it may concern:*

Be it known that I, RICHARD H. ROBINSON, a citizen of the United States, residing at West Somerville, in the county of Middlesex and State of Massachusetts, have invented certain new and useful Improvements in Nut-Locks, of which the following is a specification.

This invention relates to nut locks, and the object thereof is to provide a simple, cheap and efficient device of this character, by means of which a nut of any usual polygonal form may be locked against rotation relative to a slotted bolt.

Another object is to provide a coöperating cap and key for engagement respectively with a nut and bolt to lock the nut against turning relatively to the bolt.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of this improved nut lock shown applied, with the key inserted ready to be folded back into locked position.

Fig. 2 is a top plan view with the key shown in full lines inserted transversely and ready to be folded into locked position, the folded position being shown in dotted lines, and another position of the key is shown in dotted lines in said figure, and Fig. 3 is a transverse vertical section.

The nut lock constituting this invention comprises a cap or shell 1 composed of a bendable strip of sheet metal 2, of a width considerably greater than the thickness of the nut N in connection with which it is to be used. This strip 2 is bent to conform to the perimeter of the nut to which it is to be applied, being here shown rectangular, and the ends 3 and 4 of the strip abut at one corner of the cap as is shown clearly in Fig. 2, one of said ends having a tongue 5 arranged at right angles and lapping the other end and secured thereto by any suitable means, preferably by riveting.

The cap 1 is provided around one end with a plurality of spaced openings 6, any desired number of which may be employed, those in the opposed walls being arranged diametrically opposite each other, and three being here shown formed in each wall.

This cap 1 is provided at the end opposite to that having the opening 6 therein, with two plates 7 and 8, arranged on adjacent walls, and bent in planes at right angles to said walls, the plate 7 overlapping plate 8 and the apertures therein registering for the passage of the bolt B as is shown clearly in Fig. 3.

This bolt B is slotted transversely and longitudinally at its threaded end as shown at 16 for the passage of a key 10. This key 10 is designed to be inserted through two of the opposed apertures 6 in the cap 1 and through the slot 16 in the bolt as is shown clearly in Fig. 1, it being understood that the shell is first engaged with the nut. This key 10 is composed of a strip of pliable metal folded intermediately of its ends at 11 and the members 12 and 13 thereof arranged in contact throughout their length, member 13 being slightly longer than the member 12 to provide a finger grip 13' for spreading the ends of these members in a manner presently to be described. This key is bent near its folded end at 14 as shown in Figs. 1 and 2, and the right-angularly disposed arm 15 provided by thus bending the key, is designed to lie flat against the outer foce of one of the side walls of the cap as shown clearly in Figs. 1 and 2, and operates as a head to limit the passage of the key. After this key has been inserted as shown in Figs. 1 and 2, the free ends of the members 12 and 13 are bent outwardly in opposite directions as shown in dotted lines in Fig. 2, lying flat against the outer face of the side wall of the cap against which the head 15 bears.

In the use of this nut lock, the shell or cap 1 is designed to turn with the nut N and is applied by inserting the nut in the cap and then screwing the former on the threaded end of the bolt B until it reaches the desired point. The key 10 is then passed through two diametrically opposite slots 6 which register or aline with the slots 16 in the bolt end. The free ends of the key are then bent outwardly in opposite directions thereby securely fastening the nut to the bolt and preventing all possibility of its turning relatively thereto.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof I desire to have it understood that the device shown is merely illustrative and that such changes may be made as are within the scope of the claimed invention.

Having thus fully described my invention, what I claim as new and desire to secure by Letters Patent, is:—

The combination with a slotted bolt and a nut; of a shell composed of a bendable strip of sheet metal of a width greater than the thickness of the nut and bent to conform to the perimeter thereof, the ends of said strip abutting and one of said ends having a tongue arranged at right angles and lapping the other end and secured thereto, said shell having a plurality of spaced rectangular openings in the end which projects beyond the nut, and a key composed of a flat pliable metal strip folded intermediate its ends with its folded end bent at right angles to form an abutment, said key being adapted to extend through two of the openings in said shell and the slot in said bolt, the free ends being bent outwardly to lock the key in engagement with the shell.

In testimony whereof I affix my signature in presence of two witnesses.

RICHARD H. ROBINSON.

Witnesses:
ELEANOR WILMOT,
ETHEL M. ROBINSON.

Copies of this patent may be obtained for five cents each, by addressing the "Commissioner of Patents, Washington, D. C."